United States Patent
Huang (10) Patent No.: US 7,395,578 B2
(45) Date of Patent: Jul. 8, 2008

(54) JOINT DEVICE FOR WIPER ARM OF CAR WINDSHIELD

(76) Inventor: Shih-Hsien Huang, 7F. -2, No. 37, Jhengsin St., Zuoying District, Kaohsiung City 813 (TW)

( * ) Notice: Subject to any disclaimer, the term of this patent is extended or adjusted under 35 U.S.C. 154(b) by 0 days.

(21) Appl. No.: 11/525,836

(22) Filed: Sep. 25, 2006

(65) Prior Publication Data

US 2007/0067941 A1    Mar. 29, 2007

(30) Foreign Application Priority Data

Sep. 29, 2005   (TW) ............................. 94216941 U (51) Int. Cl.
*B60S 1/40*      (2006.01)
(52) U.S. Cl. .............. 15/250.32; 15/250.351; 15/250.43; 403/24; 403/321; 403/325; 403/329
(58) Field of Classification Search .............. 15/250.32, 15/250.43, 250.44, 250.351; 403/24, 119, 403/321, 325, 327, 329
See application file for complete search history.

(56) References Cited

U.S. PATENT DOCUMENTS

| | | | |
|---|---|---|---|
| 6,687,948 B2 | 2/2004 | Kotlarski | 15/250.32 |
| 6,782,581 B2 | 8/2004 | De Block | 15/250.32 |
| 6,836,926 B1 | 1/2005 | De Block | 15/250.43 |
| 6,836,927 B2 | 1/2005 | De Block | 15/250.43 |
| 6,910,244 B2 | 6/2005 | Block et al. | 15/250.32 |
| 2004/0025280 A1 | 2/2004 | Krickau et al. | 15/250.32 |
| 2004/0098821 A1 | 5/2004 | Kramer et al. | 15/250.201 |
| 2005/0039292 A1 | 2/2005 | Boland et al. | 15/250.32 |
| 2005/0177970 A1 | 8/2005 | Scholl et al. | 15/250.32 |

FOREIGN PATENT DOCUMENTS

| | | | |
|---|---|---|---|
| FR | 2865699 | * | 8/2005 |
| WO | 02/40328 | * | 5/2002 |

* cited by examiner

*Primary Examiner*—Gary K Graham
(74) *Attorney, Agent, or Firm*—Bacon & Thomas, PLLC (57) ABSTRACT

The present invention relates to a joint apparatus of car windshield wiper arm, which comprises a gripping cabin and a chassis; wherein, said gripping cabin having a hollow opening perforates through at the junction of the top surface and the front side; a vertical elastic hook is erected at the center of said hollow opening; and a pair of snap-on lugs are outwards respectively protruded at two junctions in the left side and right side of said gripping cabin with the rear side. By means of said vertical elastic hook and two snap-on lugs buckling engagement with the front tab and two bottom flaps on the head of said wiper arm, the rigging joint between of said wiper and said wiper arm become more securely firm; Besides, in the practical operation of dismantling and replacing worn wiper by new one, the separation of said wiper from said wiper arm can be easily, simply and rapidly accomplished by directly applying force on said vertical elastic hook with only one finger.

1 Claim, 13 Drawing Sheets

JOINT DEVICE FOR WIPER ARM OF CAR WINDSHIELD

FIELD OF THE PRESENT INVENTION

The present invention relates to a joint device for wiper arm of car windshield, more particularly being contrived as an exclusive joint apparatus for the snap-on-type wiper arm simultaneously having a front tab on the head and having bottom flap at both sides of its bottom end. Hence, the user can easily disjoint it off said snap-on-type wiper arm by only one hand manipulation. Thus, the operation of dismantling disassembly and rigging assembly in replacing worn wiper by new one becomes fast, rapid, simple and smooth.

BACKGROUND OF THE PRESENT INVENTION

Figures 1, 1A:
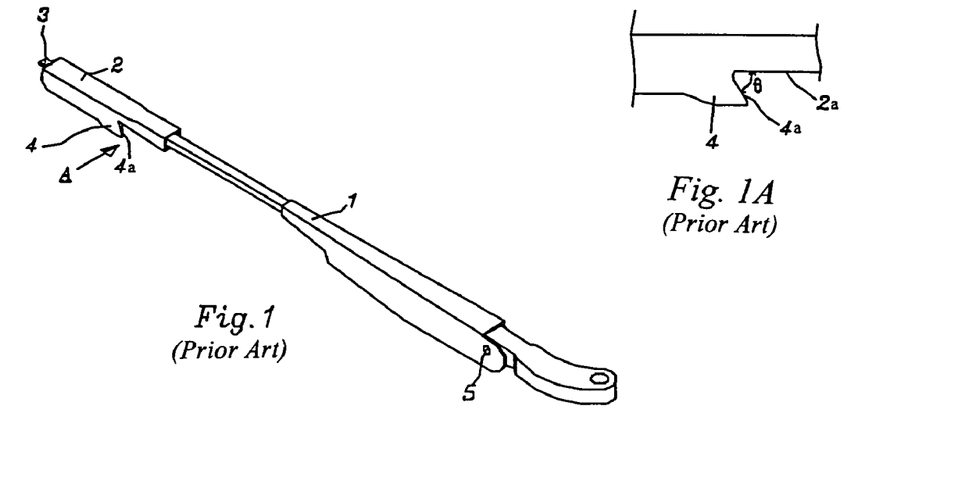
FIG. 1 is the 3-D illustrative view of the conventional wiper arm with snap-on head.
FIG. 1A is a cross-section view along section line 1A-1A of FIG. 1.
Figure 2:
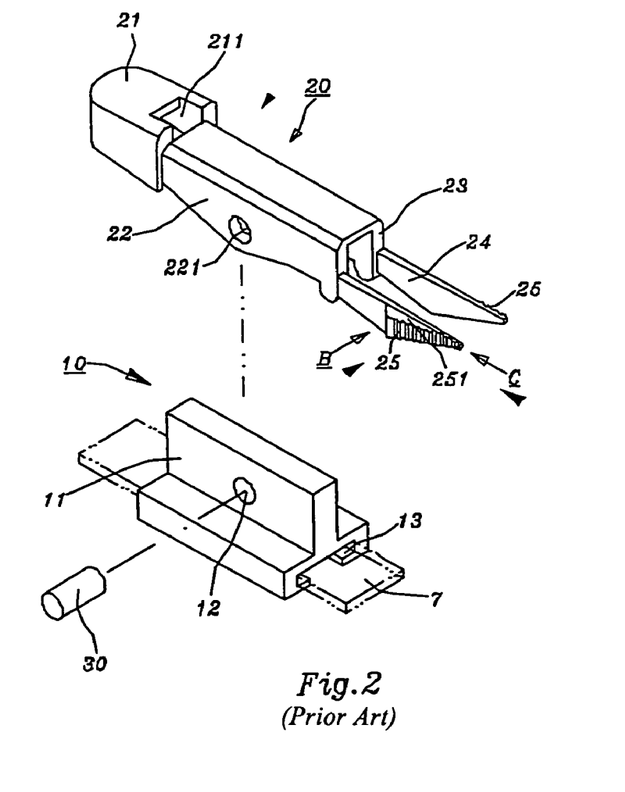
FIG. 2 is the 3-D view in decomposition of the conventional wiper arm with snap-on head in association with its exclusive joint device.
Figure 2B:
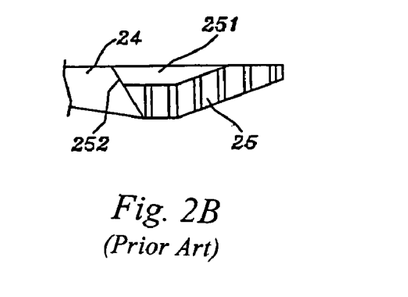
FIG. 2B is a partial view of the wiper arm of FIG. 2, showing view B of FIG. 2 in greater detail.
Figure 2C:
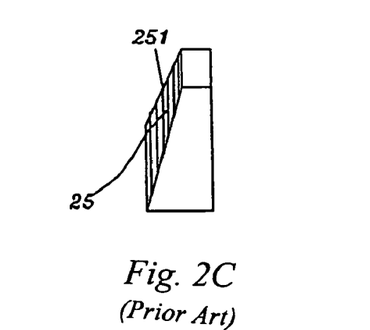
FIG. 2C is a partial view of the wiper arm of FIG. 2, showing view C of FIG. 2 in greater detail.
Figures 3, 4:
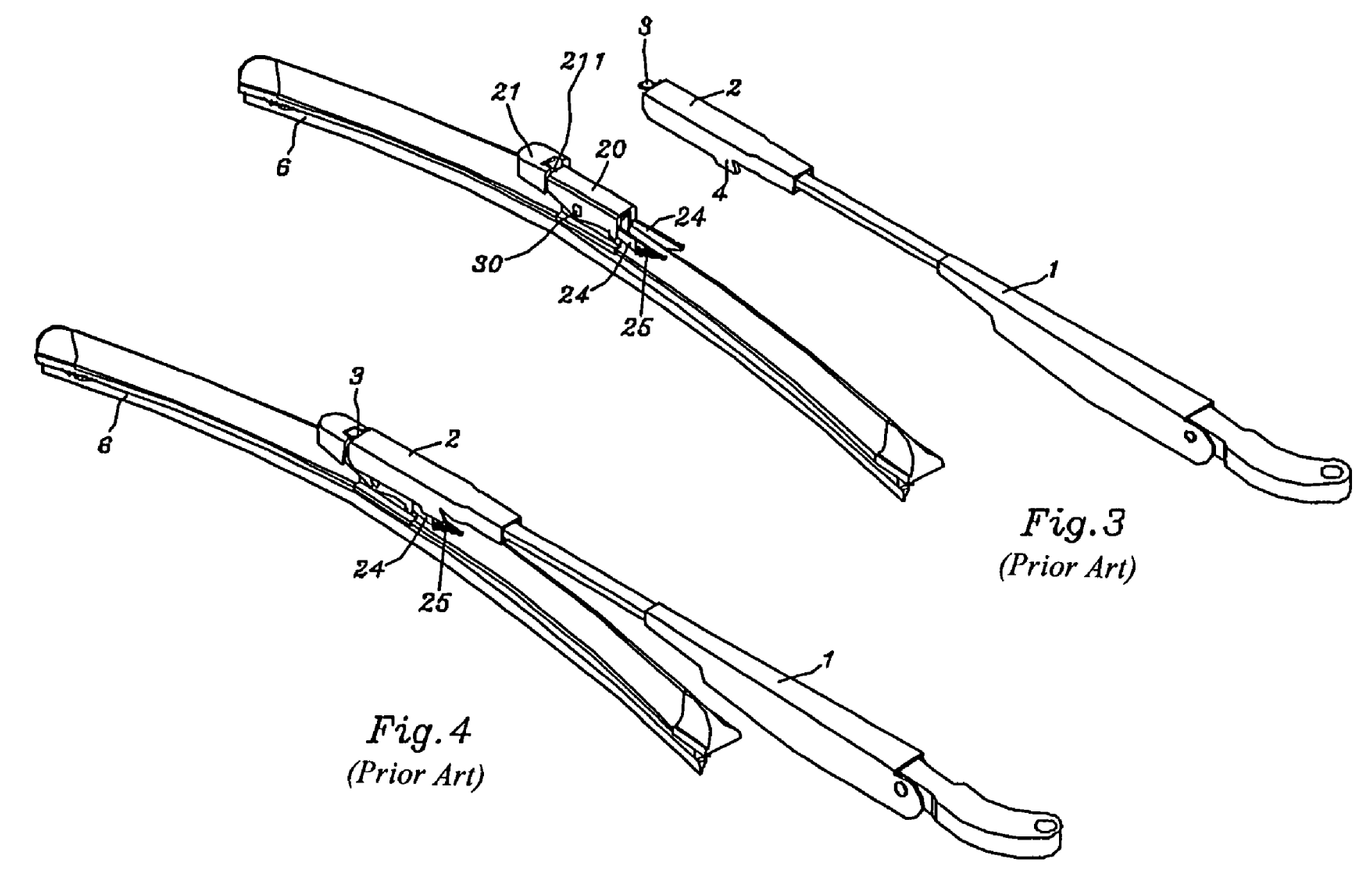
FIG. 3 is the first 3-D illustrative view in assembly of the conventional wiper arm with snap-on head in association with its exclusive joint device.
FIG. 4 is the second 3-D illustrative view in assembly of the conventional wiper arm with snap-on head in association with its exclusive joint device.
Figures 5, 5A:
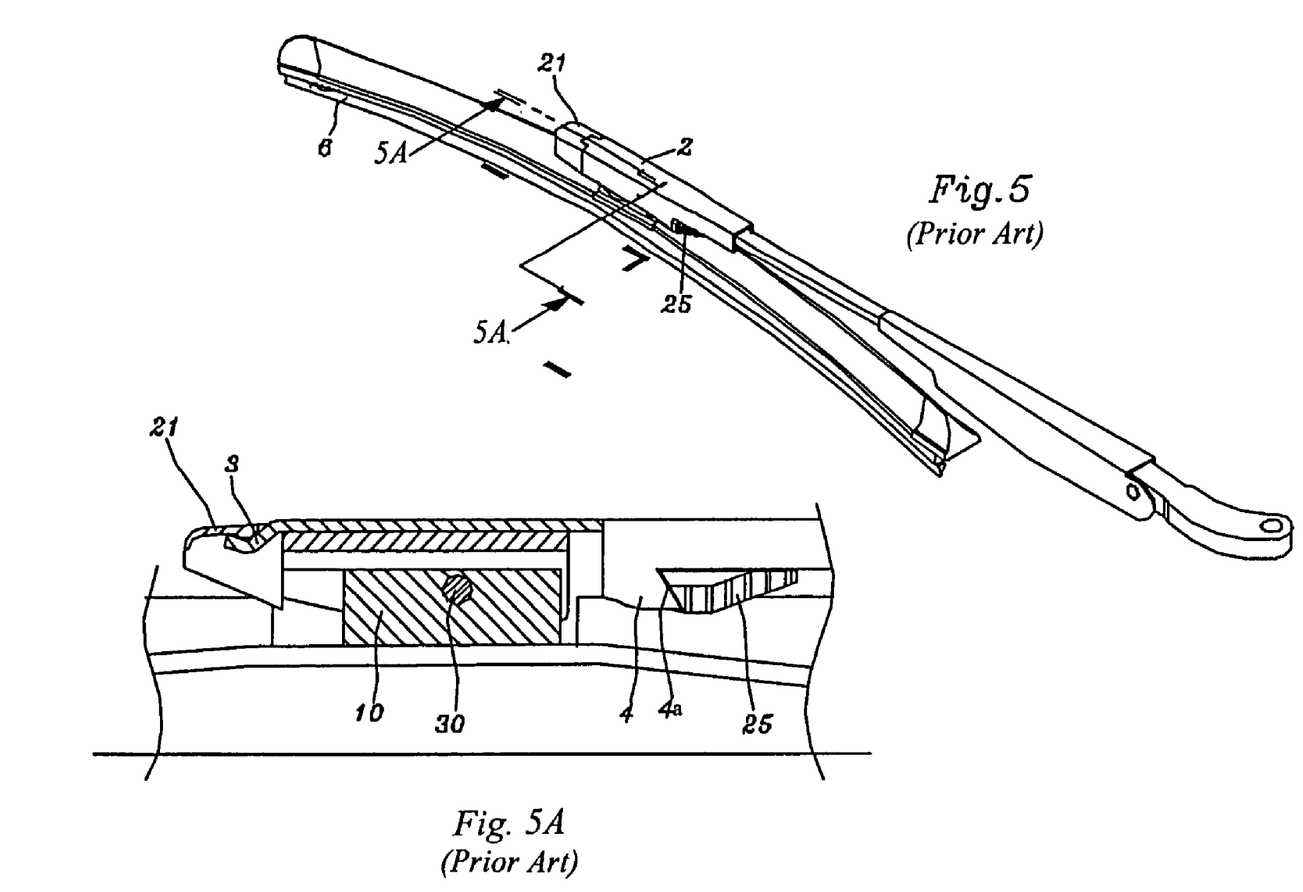
FIG. 5 is the third 3-D illustrative view in assembly of the conventional wiper arm with snap-on head in association with its exclusive joint device.
FIG. 5A is a cross-section view along section line 5A-5A of FIG. 5.
Figure 6A:
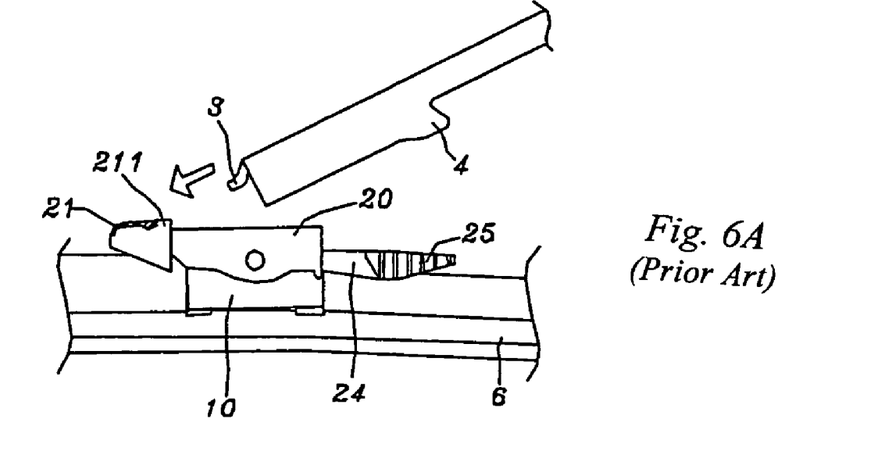
FIG. 6A is an illustrative view of a first assembly step of the conventional wiper arm with snap-on head in association with its exclusive joint device.
Figure 6B:
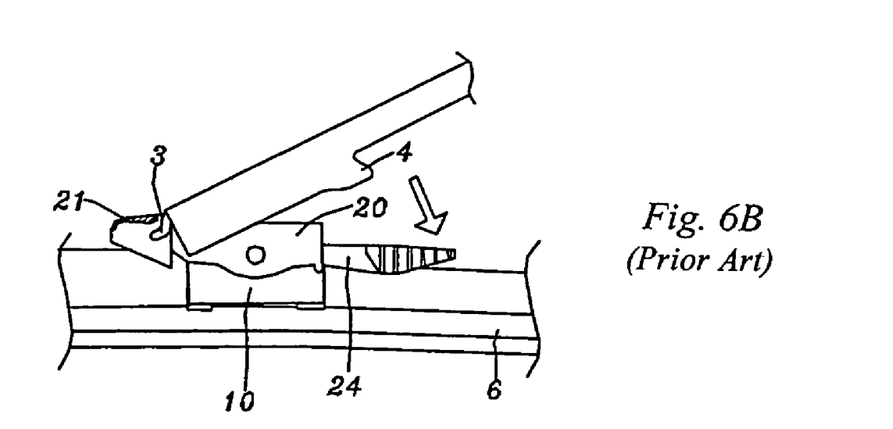
FIG. 6B illustrates a second assembly step of the conventional wiper.
Figure 6C:
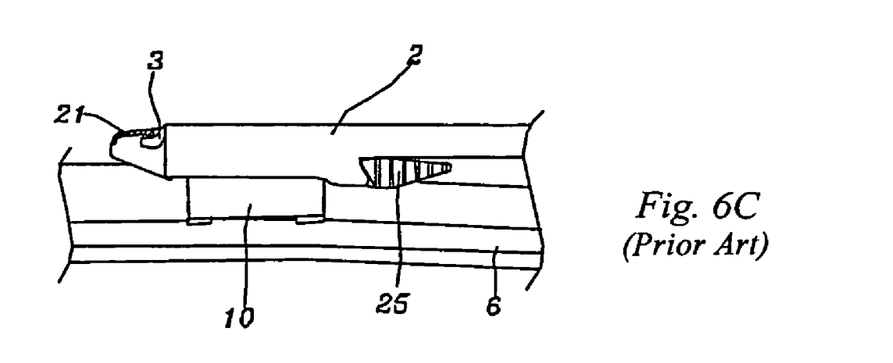
FIG. 6C illustrates a third assembly step of the conventional wiper.

Presently, the types in head of windshield wiper arm are many in variety. Different type design of wiper arm head must be coordinated with its exclusive joint device to enable securely joint each other. Such as USA issued patents U.S. Pat. No. 6,516,491, U.S. Pat. No. 6,687,948, U.S. Pat. No. 6,782,581, U.S. Pat. No. 6,836,927, U.S. Pat. No. 6,836,926 and U.S. Pat. No. 6,910,244 as well as USA published patents S2004/0025280, US2005/0039292, US2004/0098821 and US2004/0117938, all disclosed their different types of wiper arm head in association with its exclusive joint device. In which, a conventional wiper arm with snap-on head disclosed in USA published patents US2005/0177970 is shown in the FIG. 1, FIG. 3 through FIG. 5. The head 2 is a hollow cuboid, which having a upward bent front tab 3 projecting on the head and having a pair of parallel and symmetrical bottom flap 4 downwards protruding at both vertical endwise sides of its central bottom end; an end brim 4a being formed at each said bottom flap 4 inwards said wiper arm 1 and a bottom edge 2a at said head 2 intersect in a acute included angle-θ (as shown in A view of the FIG. 1); The exclusive joint device in coordination with said conventional wiper arm 1 with snap-on head as shown in the FIG. 2 through FIG. 5 comprises a main body 10 and an upper gantry 20, where said main body 10, which is a cuboid, has an upper section vertical longitudinal side 11 with a spindle hole 12 perforating through at center and a lower section base with a pair of parallel insetting clip 13 inwards juxtaposing at both bottom brim such that said insetting clip 13 and said spindle hole in perpendicular configuration; said upper gantry 20, which is a hollow cuboid directly sheathing on the top surface and both said vertical longitudinal side 11 of said main body 10, has a snap-on hole 211 perforating at the junction of front section and middle section and a round hole 221 perforating at center of each middle section vertical lengthwise side as well as a pair of parallel juxtaposing elastic fin 24 projecting at rear end side 23 of each said vertical lengthwise side 22, in which a snap-on lug 25 is outwards protruded at each free end of said both elastic fin 24 such that a oblique top 251 being contrived between said snap-on lug 25 and the top surface of said elastic fin 24 as well as an oblique side 252 with angle equivalent to said included angle-θ being contrived at the junction of said snap-on lug 25 and the vertical outer side of said elastic fin 24 (as shown in S view of the FIG. 2).

Refer to FIG. 3 through FIG. 6, the rigging join method of said (conventional wiper arm 1 with snap-on head) and its exclusive joint device is described below, First, grip the central position of said elastic metal strip 7 on said wiper 6 by said insetting clip 13 at the bottom of said main body 10, then drive said fixing spindle 30 through said round hole 221 on said vertical lengthwise side 22 and said spindle hole 12 on said vertical longitudinal side 11 of said main body 10 respectively so that enable said upper gantry 20 to swivel tilt in some limit with said fixing spindle 30 of said main body 10 as pivot; Next, align and insert said front tab 3 on the front edge of said head 2 of said wiper arm 1 into said snap-on hole 211 on said front top surface 21 of said upper gantry 20 (as shown in the FIG. 4 and A view of the FIG. 6); then apply force on said wiper arm 1 in direction towards said upper gantry 20 so that said two bottom flaps 4 on said head 2 shove said snap-on lug 25 on said elastic fin 24 of said upper gantry 20 (as shown in B view of the FIG. 6); Lastly, by means of guiding function of said oblique top 251 on each said snap-on lug 25, said two bottom flaps 4 will synchronously securely snap-on said oblique side 252 of each said snap-on lug 25 (as shown in the FIG. 5 and A-A view of the FIG. 5) to finish the rigging joint of said wiper arm 1 and said wiper 6.

Figure 7:
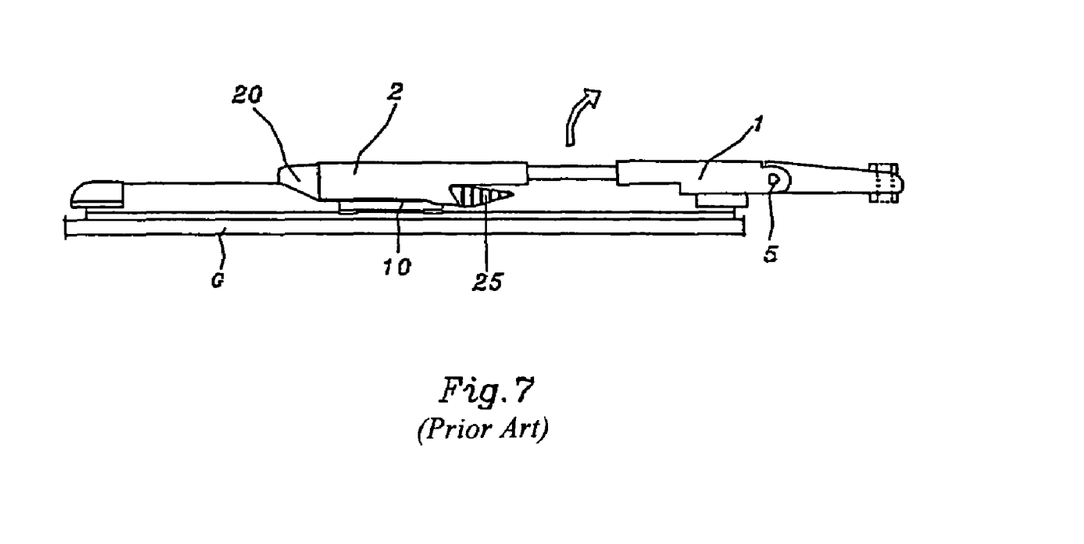
FIG. 7 is the first operation illustrative view of the conventional wiper arm with snap-on head and its exclusive joint device in the combination with windshield wiper.
Figure 8:
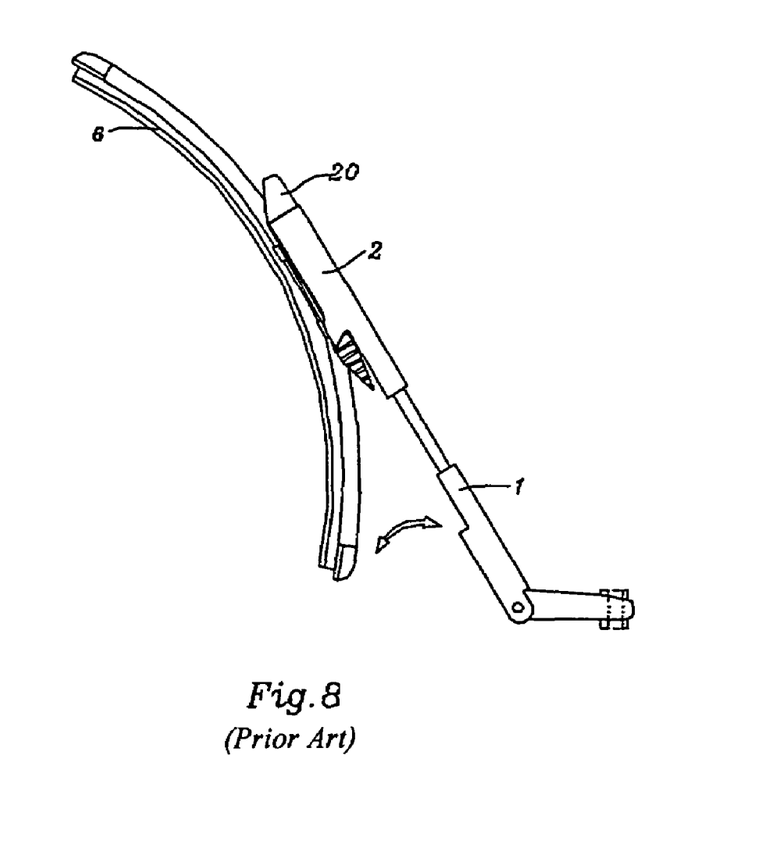
FIG. 8 is the second operation illustrative view of the conventional wiper arm with snap-on head and its exclusive joint device in the combination with windshield wiper.
Figures 9A, 9B:
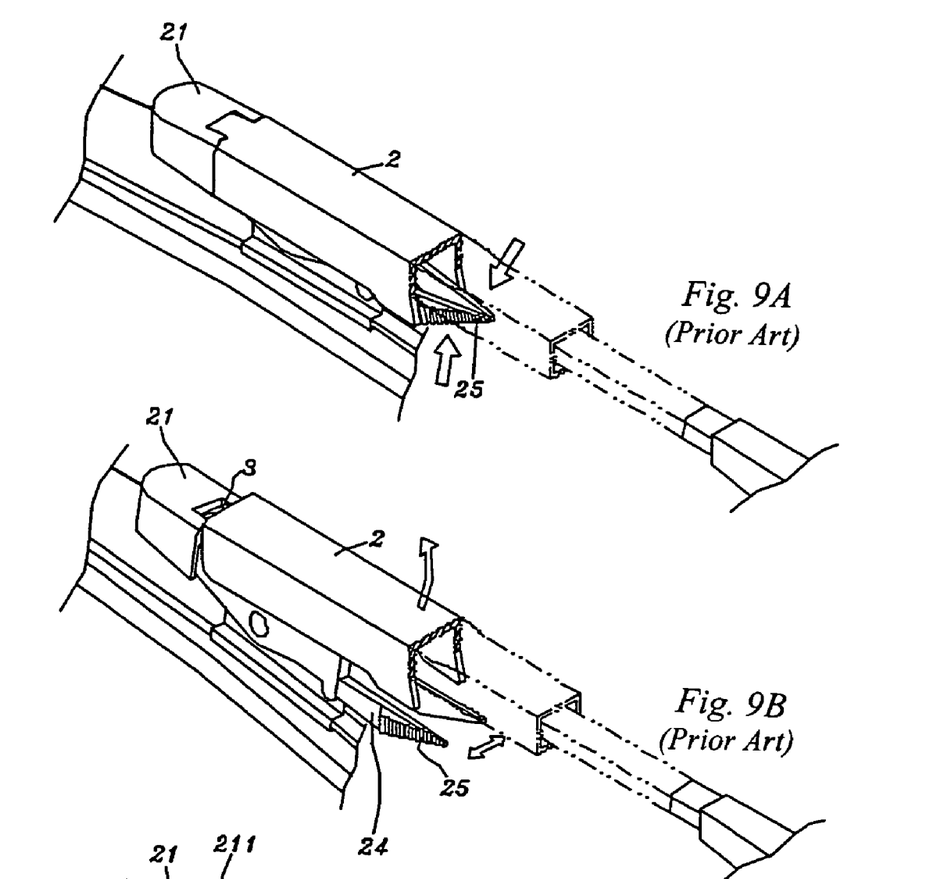
FIG. 9A illustrates a first dismantling step of the conventional wiper arm with snap-on head in association with its exclusive joint device.
FIG. 9B shows a second dismantling step of the conventional wiper.
Figure 9C:
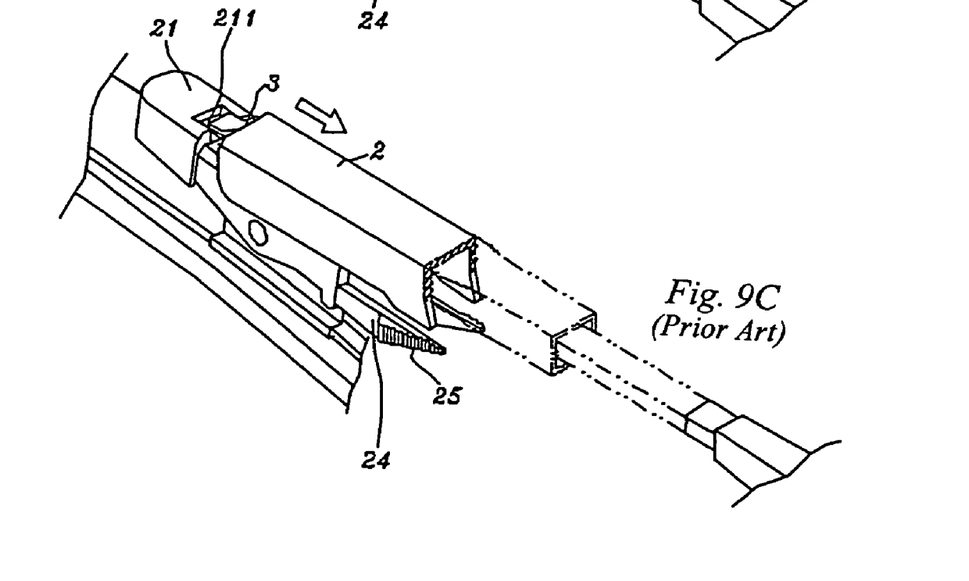
FIG. 9C shows a third dismantling step of the conventional wiper.

However, some drawbacks exist in the dismantling operation of said joint device from conventional wiper arm with (snap-on head) as below, Refer to FIG. 7 through FIG. 9, prior to the replacing a new wiper for said conventional wiper arm 1 with (snap-on head), an upwards force must be applied on wiper arm 1, which tightly stays on the windshield G in horizontal status (as shown in the FIG. 7); So that said wiper arm 1 is folded into vertical status together with said wiper 6 being separated away said windshield G in order to proceed the dismantling operation of worn wiper 6; The dismantling steps are described below:

a. Pinch two said snap-on lugs 25 on each said elastic fin 24 of said upper gantry 20 by the thumb and the forefinger of one hand to force two free ends of each said elastic fin 24 approach each other (as two arrow-heads shown in FIG. 9A); So that two said oblique sides 252 on each said snap-on lugs 25 are not snap-on confined by two said bottom flaps 4 on said head 2 any longer;

b. Hold said wiper arm 1 by another hand to apply force towards away of said upper gantry 20 in order to let said two bottom flaps 4 on said head 2 of said wiper arm 1 separate off two said elastic fins 24 on said upper gantry 20 (as shown in FIG. 9B);

c. Continuously separate said upper gantry 20 off said wiper arm 1 until said front tab 3 on said head 2 being not contact with the inner wall of said front top surface 21 on said upper gantry 20 any longer; so that let said front tab 3 get rid of the confinement of said snap-on hole 211 in order to finish the dismantling operation of worn wiper 6 off said wiper arm 1 now (as shown in FIG. 9C).

However, there are some drawbacks in aforementioned dismantling operation of worn wiper 6 as below, First, in step a, the maimed person handicapped without thumb, forefinger or middle finger is unable to force said two elastic fins 24 approach each other to get rid of the snap-on confinement by two said bottom flaps 4 (only one said elastic fin 24 being inwards compressed does not enable to separate off two said bottom flaps 4 as another said elastic fin 24 being still snapped). Such contrivance rather discriminates against the maimed person for not taking account of them. Next, there is no subsidiary fixing design with said elastic fin 24. Due to weakening elasticity caused from attachment of improper foreign matter or external force collision as well as aging by weathering, said elastic fin 24 might automatically separate off said two bottom flap 4 on said head 2 unexpectedly and hurt the surface of the windshield G eventually (it always happens in high speed swing of wiper arm adjustment during snowstorm).

SUMMARY OF THE PRESENT INVENTION

The main object of the present invention is to provide a joint apparatus of car windshield wiper arm, which comprises a gripping cabin and a chassis; wherein, said gripping cabin having a hollow opening perforates through at the junction of the top surface and the front side; a vertical elastic hook is erected at the center of said hollow opening; and a pair of snap-on lugs are outwards respectively protruded at two junctions in the left side and right side of said gripping cabin with the rear side. By means of said vertical elastic hook and two snap-on lugs buckling engagement with the front tab and two bottom flaps on the head of said wiper arm, the rigging joint between of said wiper and said wiper arm become more securely firm; Besides, in the practical operation of dismantling and replacing worn wiper by new one, the separation of said wiper from said wiper arm can be easily, simply and rapidly accomplished by directly applying force on said vertical elastic hook with only one finger.

BRIEF DESCRIPTION OF THE DRAWINGS

FIG. 12 is the illustrative view of the present invention in assembly steps of the upper cover body with chassis.

DETAILED DESCRIPTION OF THE PREFERRED EMBODIMENTS

Figure 10:
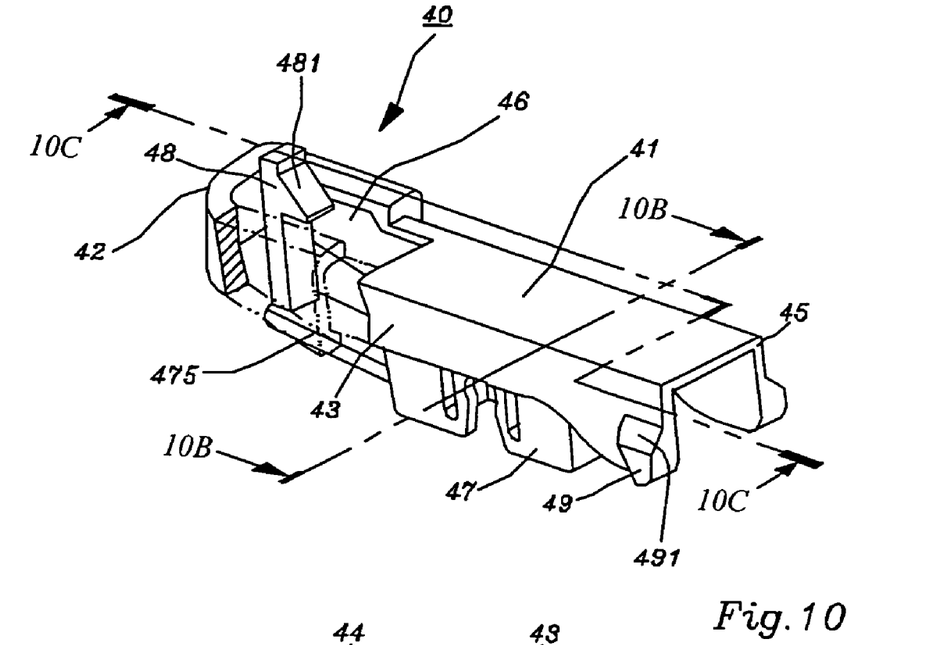
FIG. 10 is the 3-D view of the gripping cabin of the present invention.
Figure 10B:
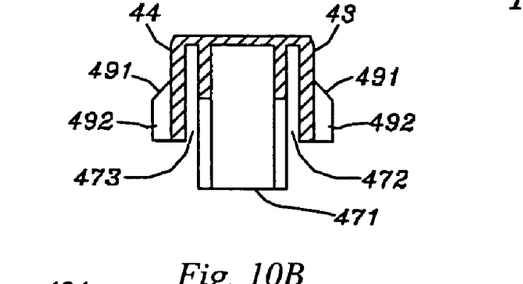
FIG. 10B is a cross-section view along section line 10B-10B of FIG. 10.
Figure 10C:
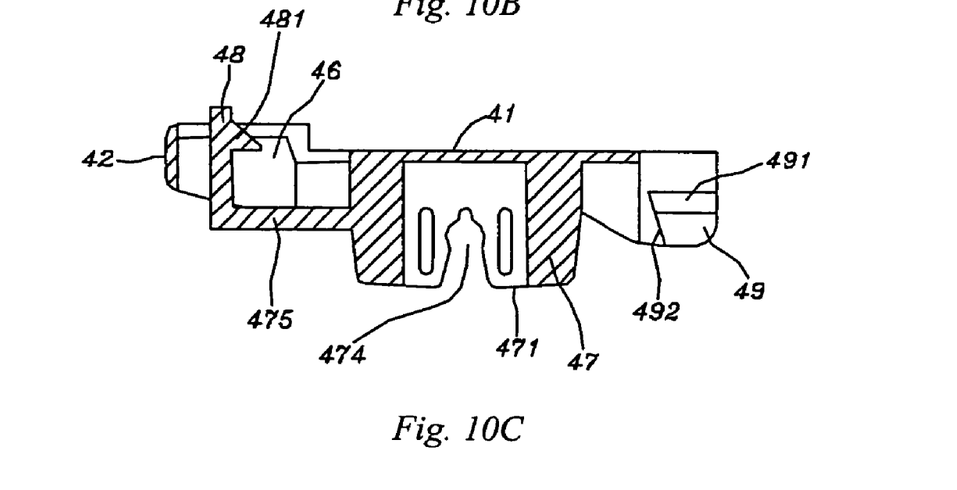
FIG. 10C is a cross-section view along section line 10C-10C of FIG. 10.
Figure 11:
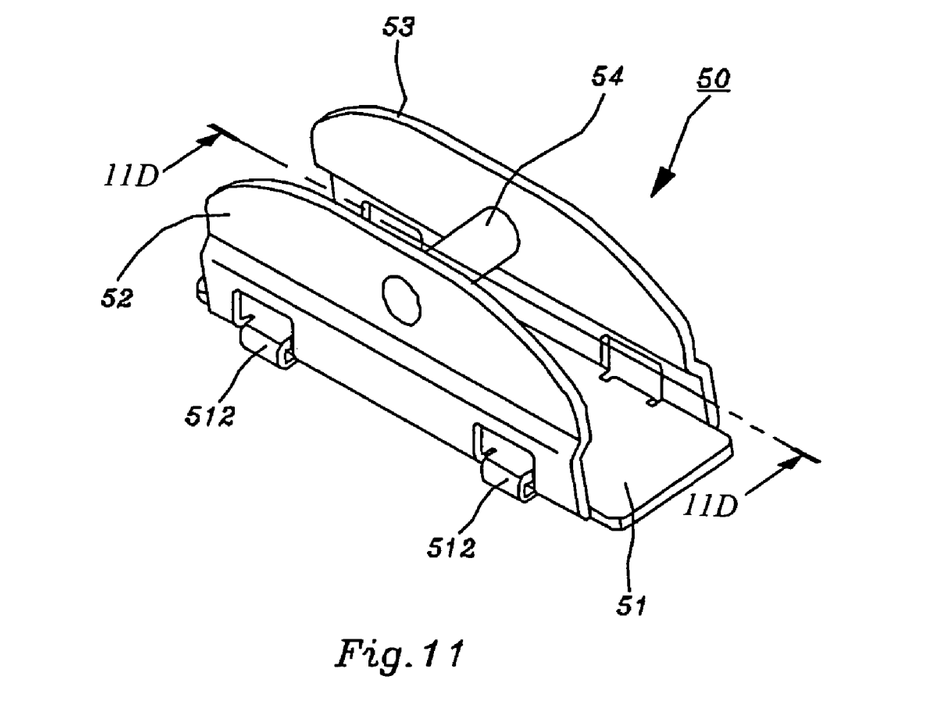
FIG. 11 is the 3-D view of the chassis of the present invention.
Figure 11D:
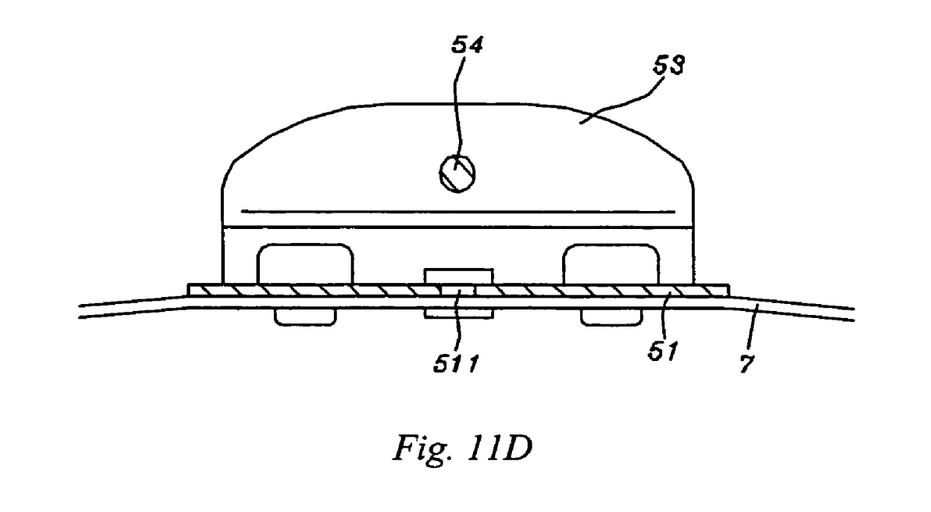
FIG. 11D is a cross-section view along line 11D-11D in FIG. 11.

Referring to FIG. 10 through FIG. 14, the present invention a joint device for wiper arm of car windshield comprises:

a gripping cabin 40, which comprises a top surface 41, a front side 42, a left side 43, a right side 44 and a rear side 45, wherein a hollow opening 46 perforates through at the junction of said top surface 41 and said front side 42; a rectangular hollow bin 47, which is downwards built on the inner side of said top surface 41 such that its bottom side 471 is longer than the bottom edge of said left side 43 and said right side 44, has a pair of parallel and symmetrical left groove 472 and right groove 473 are created between its both outer sides and said left side 43 and said right side 44 respectively (as shown in FIG. 10B); a pair of parallel and symmetrical elastic round notches 474 are indented on both outer sides of the central portion of said bottom side 471; a horizontal cantilever 475 is projected at its side towards said hollow opening 46; a vertical elastic hook 48 is erected on the free end of said cantilever 475; and a horizontal buckling nose 481 is raised at the tip towards said rear side 45 (as shown in FIG. 10C); a snap-on lug 49 is protruded on each junction of rear side 45 respectively with both of said left side 43 and right side 44; a slant top 491 is downwards formed at the top of said snap-on lug 49; a slant side 492 is formed at the side backwards said rear side 45; the included angle-θ intersected by both of said slant top 491 and slant side 492 equals that being intersected by both of said bottom edge 2a and end brim 4a on said head 2 (as shown in FIG. 10C); and a chassis 50, which comprises a bottom panel 51, a left panel 52 and a right panel 53; wherein, a fixing hole 511 is punched at the center of said bottom panel 51; a pair of parallel and symmetrical insetting clip 512 are downwards created at two sets of both sides, which are at the front and rear of said insetting clip 512 respectively; by means of a rivet running through said fixing hole 511 and the elastic metal strip 7 together with said insetting clips 512, said chassis 50 can be securely jointed to be unlikely to depart off or displace (as hypothetical dash line shown in D-D view of the FIG. 11); besides, a pair of parallel and symmetrical said left panel 52 and said right panel 53 are upwards erected at both sides of said bottom panel 51; a horizontal fixing spindle 54 is bridged at the central position in both of said left panel 52 and right panel 53 such that said fixing spindle 54 being configured in perpendicular to both of said left panel 52 and right panel 53).

Figure 12A:
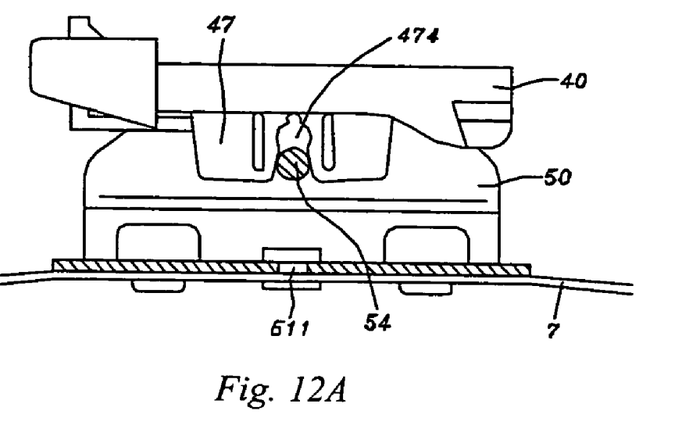
FIG. 12A illustrates a first assembly step of the upper cover body and chassis in the present invention.
Figure 12B:
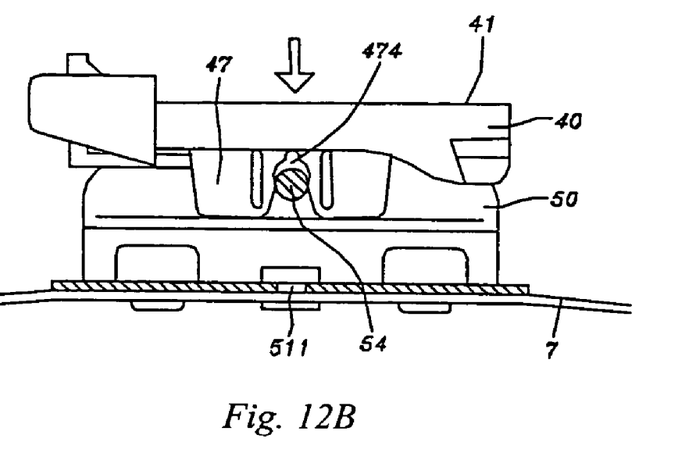
FIG. 12B illustrates a second assembly step of the upper cover body and chassis.
Figure 12C:
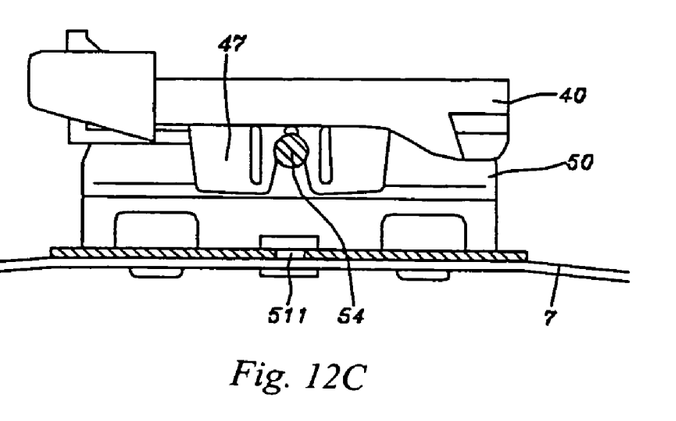
FIG. 12C illustrates a third assembly step of the upper cover body and chassis.
Figures 13, 14:
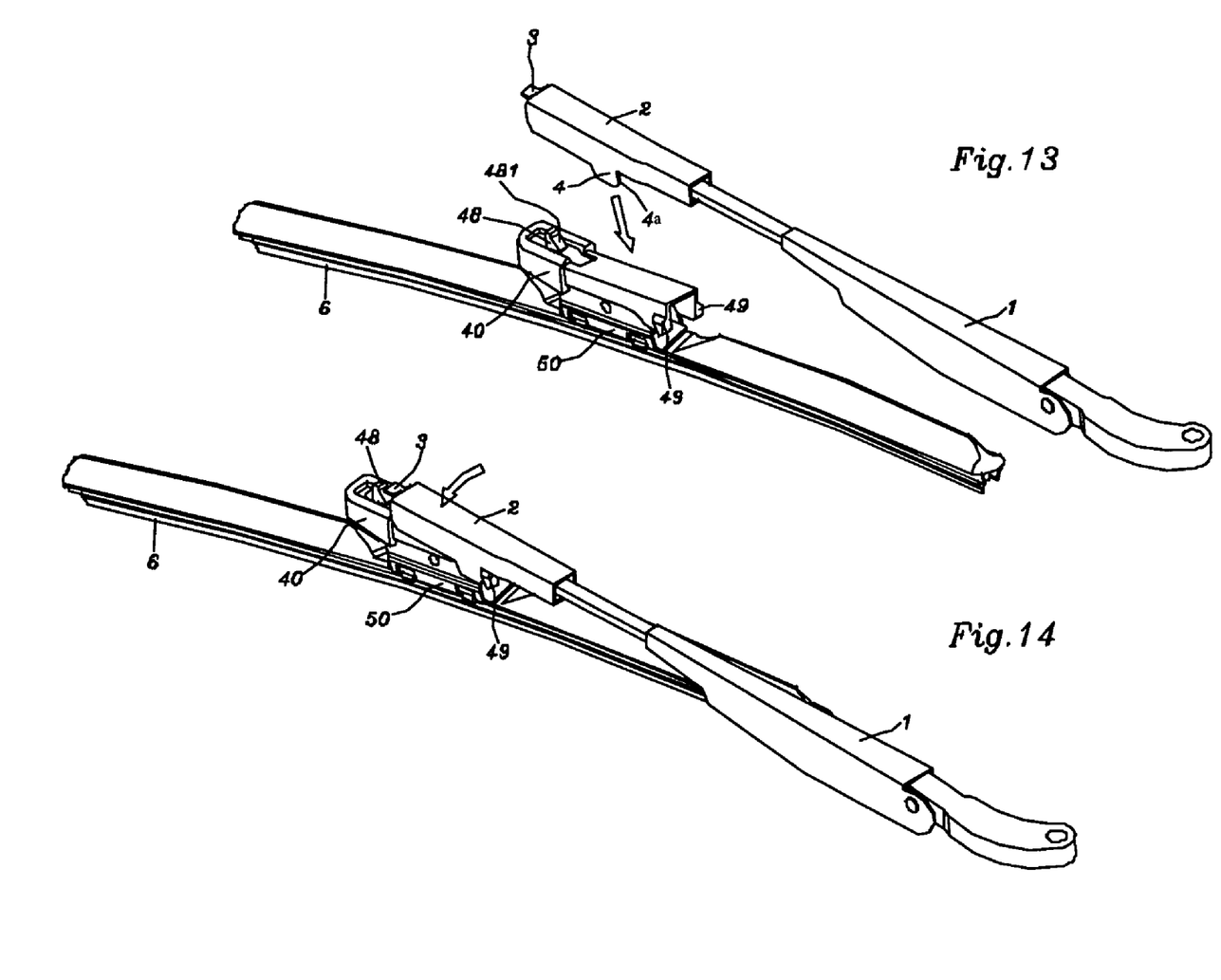
FIG. 13 is the first 3-D illustrative view in assembly of the present invention and the conventional wiper arm with snap-on head.
FIG. 14 is the second 3-D illustrative view in assembly of the present invention and the conventional wiper arm with snap-on head.
Figures 15, 16:
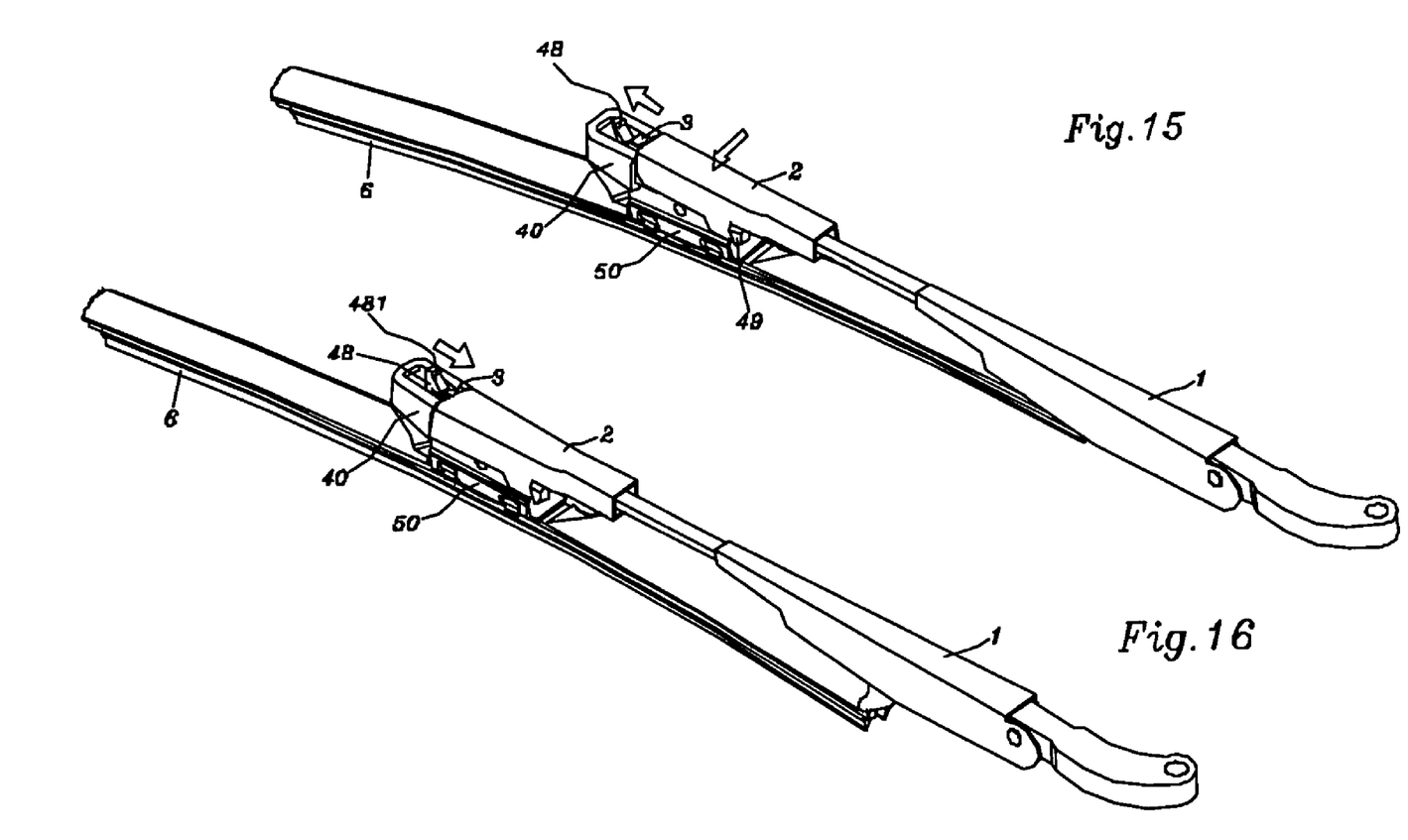
FIG. 15 is the third 3-D illustrative view in assembly of the present invention and the conventional wiper arm with snap-on head.
FIG. 16 is the fourth 3-D illustrative view in assembly of the present invention and the conventional wiper arm with snap-on head.

Refer to FIG. 12 through FIG. 16, the method and step in rigging assembly of the present invention and said (conventional wiper arm 1 with snap-on head) is described as below:

First, align both of said elastic round notches 474 on said hollow bin 47 of said gripping cabin 40 with said fixing spindle 54 on the center of said chassis 50 (as shown in FIG. 12A); apply a downwards force on said top surface 41 of said gripping cabin 40, then both of said elastic round notches 474 will outwards stretch due to resistance from said fixing spindle 54 (as shown in FIG. 12B); continuously apply force, said fixing spindle 54 will be totally inserted into both of said elastic round notches 474, thus the joint of said gripping cabin 40 and said chassis 50 is finished now (as shown in FIG. B); Next, tilt upwards said head 2 on said wiper arm 1 such that each said bottom edge 2a on both of said bottom flaps 4 being aligned with each said slant side 492 on both of said snap-on lugs 49 at both sides of said gripping cabin 40 (as shown in the FIG. 13); Keeping said head 2 in oblique elevation, inset both of said bottom flaps 4 with both of said snap-on lugs 49 (as shown in the FIG. 14); Lastly, with both of said snap-on lugs 49 as pivot, press downwards said head 2 into horizontal status, then said front tab 3 will simultaneously jostle against said horizontal buckling nose 481 on said vertical elastic hook 48 such that said vertical elastic hook 48 being backwards bent (as shown in the FIG. 15); upon said front tab 3 on said head 2 slipping into said horizontal buckling nose 481 on said vertical elastic hook 48, a snap sound of buckling engagement will be heard, thus the rigging joint of said wiper arm 1 with said wiper 6 is completed now (as shown in the FIG. 16).

Figure 17:
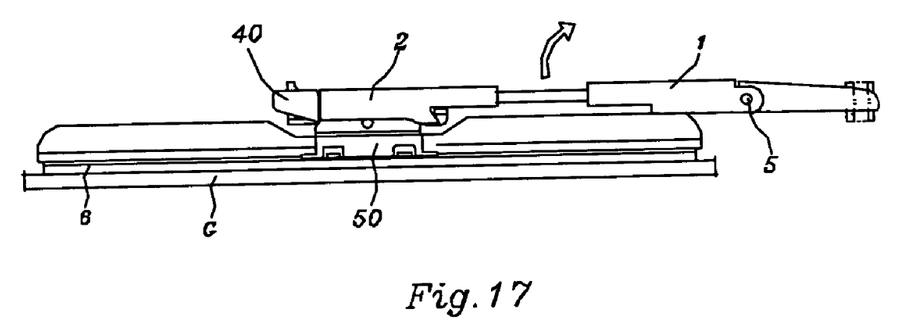
FIG. 17 is the first operation illustrative view of the present invention in combination with the windshield wiper and conventional wiper arm with snap-on head.
Figure 18:
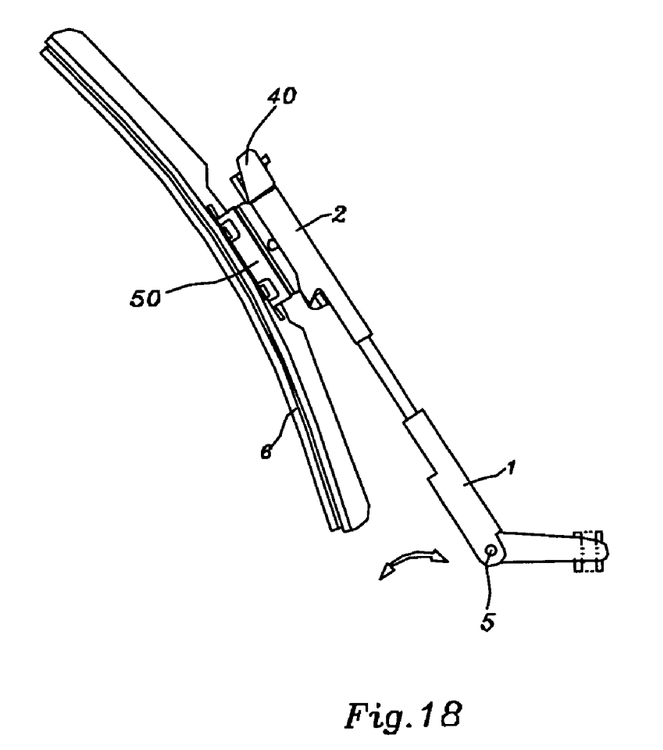
FIG. 18 is the second operation illustrative view of the present invention in combination with the windshield wiper and conventional wiper arm with snap-on head.
Figure 19A:
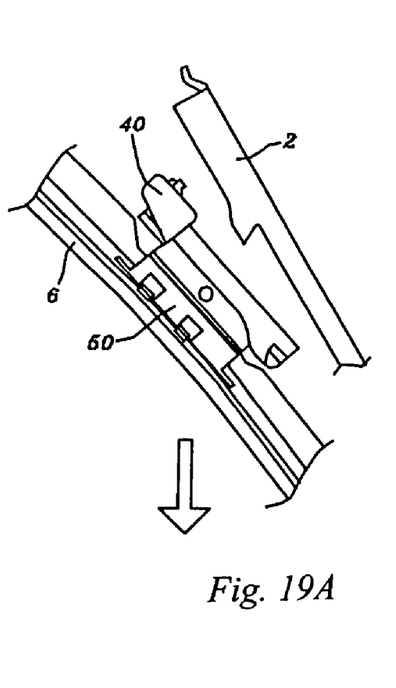
FIG. 19A illustrates a first dismantling step from the conventional wiper arm with snap-on head.
Figures 19B, 19C:
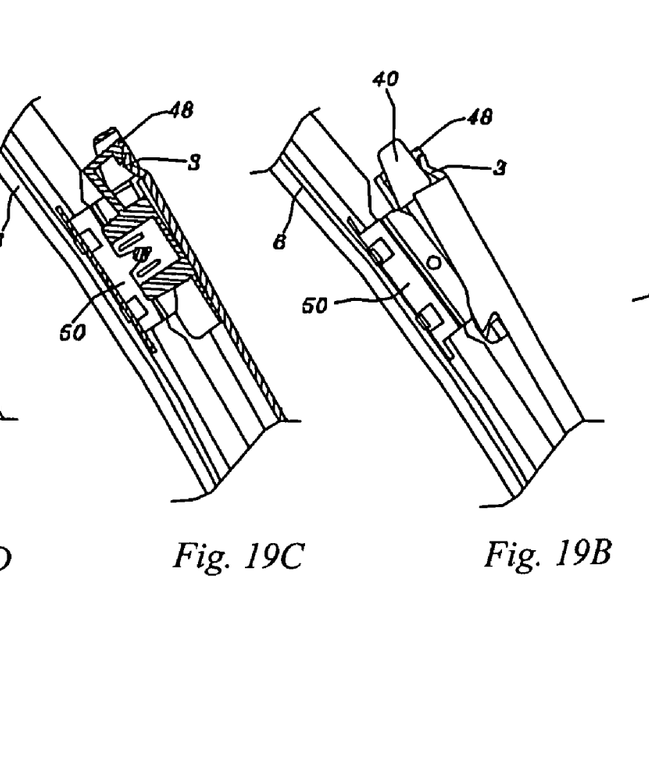
FIG. 19B illustrates a second dismantling step from the conventional wiper arm with snap-on head.
FIG. 19C illustrates a third dismantling step from the conventional wiper arm with snap-on head.
Figure 19D:
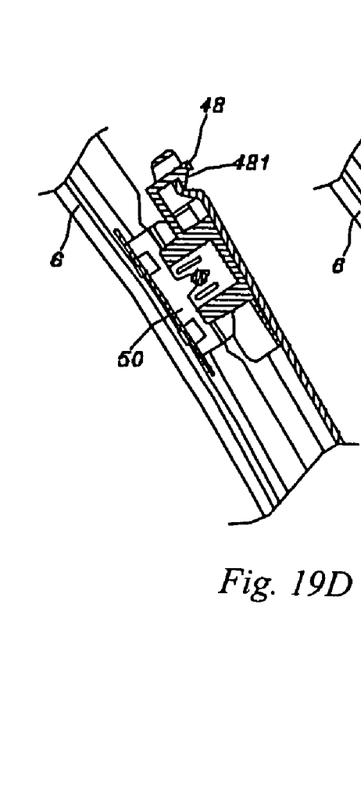
FIG. 19D illustrates a forth dismantling step from the conventional wiper arm with snap-on head.

Refer to FIG. 17 through FIG. 19, as said conventional wiper arm with snap-on head; prior to the replacing a new wiper for the present invention, an upwards force must be applied on wiper arm 1, which tightly stays on the windshield G in horizontal status (as shown in the FIG. 17); So that said wiper arm 1 is folded into vertical status in order to proceed the dismantling operation; The dismantling step is rather simple and rapid as directly applying force on said vertical elastic hook 48 to bend it bend backwards by only one finger (as shown in FIGS. 19A and 19B); until the bending degree of said vertical elastic hook 48 is big enough to free said front tab 3 on said head 2 from the buckling engagement of said horizontal buckling nose 481, the front edge of said head 2 is enabled to depart off the snap-on engagement (as shown in FIG. 19C); Under gravity affect, the integral body of said gripping cabin 40 and said chassis 50 will synchronously slip off and separate automatically from said wiper arm 1 due to its total weight (as shown in FIG. 19D); hence the whole dismantling operation can be accomplished at one go so that even the maimed person handicapped with finger can easily do it (as no need of two fingers simultaneously applying force); Moreover, because both of said snap-on lugs 49 on said gripping cabin 40 are solid fixed instead of moving flexible structure, not only it will not depart off due to violently swing in high speed of said wiper arm 1, but also it will not unexpectedly separate off due to collision from external force.

What is claimed is:

1. A joint device for joining to a wiper arm of car windshield comprises:

a gripping cabin, which comprises a top surface, a front side, a left side, a right side and a rear side, wherein, a hollow opening perforates through at a junction of said top surface and said front side; a rectangular hollow bin, which is downwards built on an inner side of said top surface such that its bottom side is longer than the bottom edge of said left side and said right side, has a pair of parallel and symmetrical left groove and right groove created between its both outer sides and said left side and said right side respectively; a pair of parallel and symmetrical elastic round notches are indented on both outer sides of the central portion of said bottom side; a horizontal cantilever is projected at its side towards said hollow opening; a vertical elastic hook is erected on a free end of said cantilever; and a horizontal buckling nose is raised at a tip towards said rear side; a snap-on lug is protruded on each junction of rear side respectively with both of said left side and right side; a slant top is downwards formed at a top of said snap-on lug; a slant side is formed at a side of said snap-on lug, backwards said rear side; the included angle intersected by both of said slant top and slant side equals that being intersected by both of a bottom edge and end brim on a head of said wiper arm when said gripping cabin is joined to said head; and a chassis, which comprises a bottom panel, a left panel and a right panel; wherein, a fixing hole is punched at the center of said bottom panel; a pair of parallel and symmetrical insetting clips are downwards created at two sets of both sides, which are at the front and rear of said chassis respectively; wherein said left panel and said right panel are upwards erected at both sides of said bottom panel and are parallel and symmetrical with one another; a horizontal fixing spindle is bridged at a central position in both of said left panel and right panel.

* * * * *